W. CAMPBELL.

CURTAIN-FIXTURES.

Reissued Oct. 31, 1876.

No. 7,367.

WITNESSES

L. D. Law

Hugh Jones

INVENTOR

William Campbell

UNITED STATES PATENT OFFICE.

WILLIAM CAMPBELL, OF NEW YORK, N. Y., ASSIGNOR TO STEWART HARTSHORN, OF SAME PLACE.

IMPROVEMENT IN CURTAIN-FIXTURES.

Specification forming part of Letters Patent No. 69,176, dated September 24, 1867; reissue No. 7,367, dated October 31, 1876; application filed May 27, 1875.

*To all whom it may concern:*

Be it known that I, WILLIAM CAMPBELL, of the city, county, and State of New York, have invented a new and useful Improvement in Window-Shade Fixtures; and I do hereby declare that the following is a full, clear, and concise description of the same, reference being had to the accompanying drawings, making a part of this specification.

This invention is an improvement in that class of shade-fixtures in which the shade-roller is provided with a spiral spring for the purpose of automatically winding up the shade; and relates to an improved device or arrangement of parts by means of which such spring-roller, and the shade attached thereto, may be arrested and held stationary at any desired point or elevation within the range of its movement, and at the same time allow the shade to be drawn down or run up as far as may be desired without obstruction or stoppage, and by means of which also the tension of the spring will be preserved, or the spring be prevented from uncoiling when the roller is removed from the brackets, the same as when resting therein.

In such fixtures, as generally heretofore constructed, when the shade-roller is removed from the brackets the spring in the roller unwinds, which renders it necessary to again wind up such spring before placing the roller in its brackets, and this it is not easy for an ordinary or unskilled person to do; and it consists in the combination, with a flattened or notched shaft or spindle of the roller, which acts as a ratchet, of loose or sliding pins or bolts acting as pawls or detents, and which, by their contact with such flattened or notched shaft or spindle, arrest and hold stationary the roller and its shade at any point desired, and in arranging such pins or detents on the roller having such a flattened or notched spindle, so that there will be no disconnection of the detent and ratchet when the roller is removed from its brackets, which prevents the spring unwinding.

Figure 1:
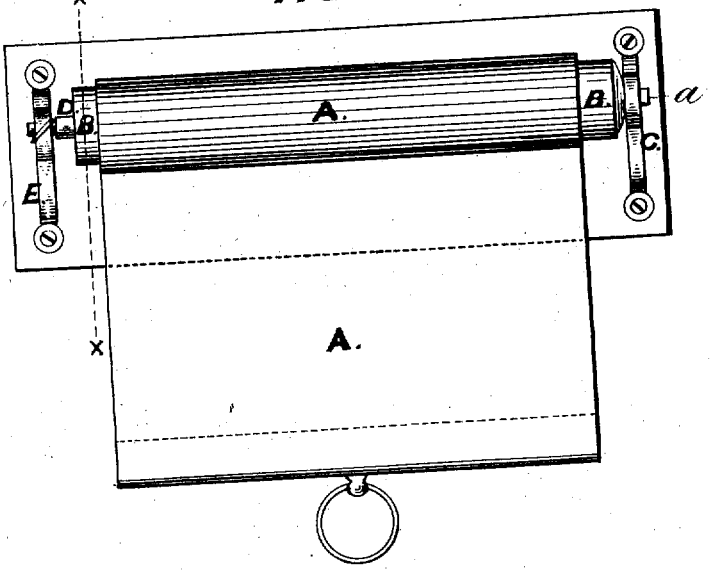
Figure 2:
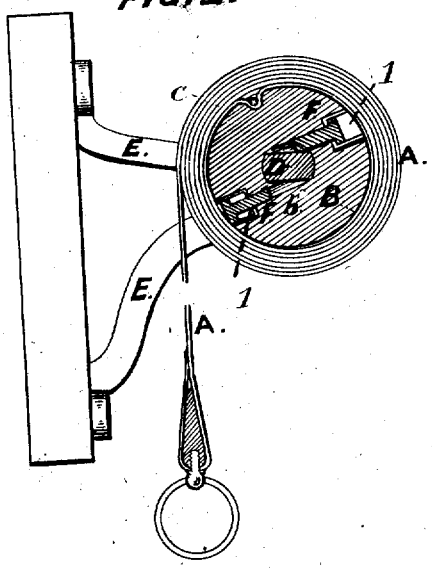
Figure 3:
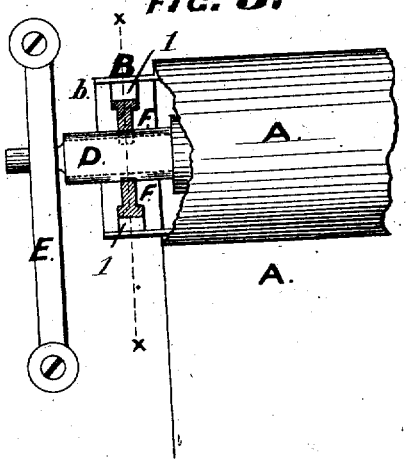

Figure 1 is a front view of a roller, with shade attached, containing my improvement. Fig. 2 is a detail sectional view, enlarged, of the same, through the line *x x*, Fig. 1. Fig. 3 is an enlarged view of one end of Fig. 1, a part being broken away to show the position of the operative parts.

A is the window-shade. B is the hollow roller, in one end of which is fixed a pivot or spindle, *a*, turning with the roller, and which rests and turns in the bracket C, and the other end of such roller revolves upon the shaft or spindle D, the projecting end of which does not turn with the roller, but is held or secured in the jaws of the bracket E. One end of the spiral spring, within the roller B, is secured to the spindle D, and the other end to the roller B, so that, as the shade A is drawn down and the roller revolved, the spring will be wound up or closer around the shaft D, and thus have, when not restrained, a tendency to roll up the shade.

In the block or cap part *b*, that forms the end of the roller B, and forms its bearing upon the shaft or spindle D, and about which it revolves, are two holes or cavities, 1 1, upon opposite sides, extending from its outer surface to the shaft or spindle D, as shown in Fig. 2, the outer ends of which cavities may be countersunk, as shown.

The opposite sides of the shaft or spindle D, within the block or cap part *b* of the roller, are flattened or notched, as shown in Fig. 2, to take the pins or bolts moving in the cavities 1. F F are two pins or bolts, or detents, the bodies of which fit loosely in the holes 1 1 in the block or cap *b*, and the heads of which fit loosely in the countersunk parts of such holes, the length of such bolts or detents being such that, when their heads are against the case or shell *c* of the roller, their points or lower ends will be free from or not be in contact with the shaft or spindle D; but when such bolts drop, so that their heads rest upon the bottom of the countersunk part of such holes, their points or lower ends will be in contact with the flattened or notched sides of the spindle or shaft D, so as to bind against such spindle and prevent the revolution of the roller. Whenever the shade A is drawn down, or is allowed to run up with a quick movement, the centrifugal force, produced by the revolution of the roller B, projects the pins outward, so that they are carried away from the spindle D, and against the case or shell *c* of the roller, thus permitting the roller to revolve freely upon the shaft or spindle D; but when the shade and the revolution of the roller is checked, the bolt or detent F, which happens to be uppermost, drops down upon and against the flattened or notched side of the spindle D, and arrests the further revolution of the roller and holds it securely in place.

As these pins or detents are placed in a recess upon the roller, of which the spindle which forms the ratchet is also a part, they are equally effective to hold the roller from turning, whether the roller remains in or is removed from the brackets, and therefore the spring is prevented unwinding when the roller is taken out of its brackets.

The pins or detents F F are loose or sliding, as contradistinguished from such as are hinged or pivoted, and are kept in position so as to engage with the ratchet or notched spindle by the chamber or guide in which they move.

What is claimed as new is—

1. In a spring shade-roller, having a pawl or detent and a ratchet, or their equivalent, so arranged as to allow the shade to be drawn down or run up without obstruction, and which engage automatically with each other to hold the shade in any desired position, the arrangement of such pawl or detent on the roller which carries the notched spindle or ratchet, so that when the roller is removed from its brackets the tension of the spring will be preserved.

2. In a spring shade-roller, having a detent and ratchet, or their equivalent, constructed and arranged to engage automatically with each other for holding the shade, the combination, with the ratchet, or its equivalent, of a loose pawl or detent, moving in a chamber or guide, and adapted to engage with the spindle.

3. The combination of the loose or sliding pins or detents F, constructed as described, with the flattened or notched shaft or spindle, substantially as herein shown and described.

WILLIAM CAMPBELL.

Witnesses:
S. D. LAW,
HUGH JONES.